(12) United States Patent
Bull et al.

(10) Patent No.: US 11,269,407 B2
(45) Date of Patent: Mar. 8, 2022

(54) SYSTEM AND METHOD OF DETERMINING ATTRIBUTES OF A WORKSPACE CONFIGURATION BASED ON EYE GAZE OR HEAD POSE

(71) Applicant: Dell Products L.P., Round Rock, TX (US)

(72) Inventors: Spencer G. Bull, Cedar Park, TX (US); Tyler Ryan Cox, Austin, TX (US)

(73) Assignee: Dell Products L.P., Round Rock, TX (US)

( * ) Notice: Subject to any disclaimer, the term of this patent is extended or adjusted under 35 U.S.C. 154(b) by 1 day.

(21) Appl. No.: 16/776,796

(22) Filed: Jan. 30, 2020

(65) Prior Publication Data
US 2021/0240259 A1    Aug. 5, 2021

(51) Int. Cl.
*G06F 3/01* (2006.01)
*G06F 3/14* (2006.01)

(52) U.S. Cl.
CPC .............. *G06F 3/013* (2013.01); *G06F 3/012* (2013.01); *G06F 3/1423* (2013.01)

(58) Field of Classification Search
CPC ....... G06T 19/006; G06F 3/013; G06F 3/017; G06F 3/16; G02B 27/017; G02B 2027/0178; H04N 5/23229
See application file for complete search history.

(56) References Cited

U.S. PATENT DOCUMENTS

| | | | |
|---|---|---|---|
| 5,920,395 A * | 7/1999 | Schulz | A61B 8/00 356/622 |
| 10,249,095 B2 * | 4/2019 | Energin | G06F 3/0482 |
| 10,540,008 B2 * | 1/2020 | Klingstrom | G06F 3/017 |
| 10,559,133 B2 * | 2/2020 | Knoppert | G06T 19/20 |
| 10,572,005 B2 * | 2/2020 | Zahn | G06F 3/011 |
| 10,852,817 B1 * | 12/2020 | Ouderkirk | G06K 9/00597 |
| 10,976,814 B2 * | 4/2021 | Aleem | G02B 27/0172 |
| 2015/0049012 A1 * | 2/2015 | Liu | G06F 3/017 345/156 |
| 2016/0162020 A1 * | 6/2016 | Lehman | G06F 3/04842 715/835 |
| 2017/0061694 A1 * | 3/2017 | Giraldi | G06F 3/013 |
| 2017/0206691 A1 * | 7/2017 | Harrises | G02B 27/0172 |
| 2017/0285741 A1 * | 10/2017 | Park | G06K 9/00617 |
| 2018/0288477 A1 * | 10/2018 | Gupta | H04N 21/434 |
| 2019/0371028 A1 * | 12/2019 | Harrises | G06T 11/60 |
| 2020/0264699 A1 * | 8/2020 | Leland | G06F 1/1677 |

* cited by examiner

*Primary Examiner* — William Lu
(74) *Attorney, Agent, or Firm* — Baker Botts L.L.P.

(57) ABSTRACT

In one or more embodiments, one or more systems, methods, and/or processes may: determine, based at least on first reflections of light emissions off an eye of a user, first multiple vectors from the eye of the user to a first display of multiple displays of a workspace configuration; determine, based at least on second reflections of light emissions off the eye of the user, second multiple vectors from the eye of the user to a second display of the multiple displays; determine physical dimensions of the first display based at least on the first multiple vectors; determine physical dimensions of the second display based at least on the second multiple vectors; determine a physical location of the first display based at least on the first multiple vectors; and determine a physical location of the second display based at least on the second multiple vectors.

20 Claims, 10 Drawing Sheets

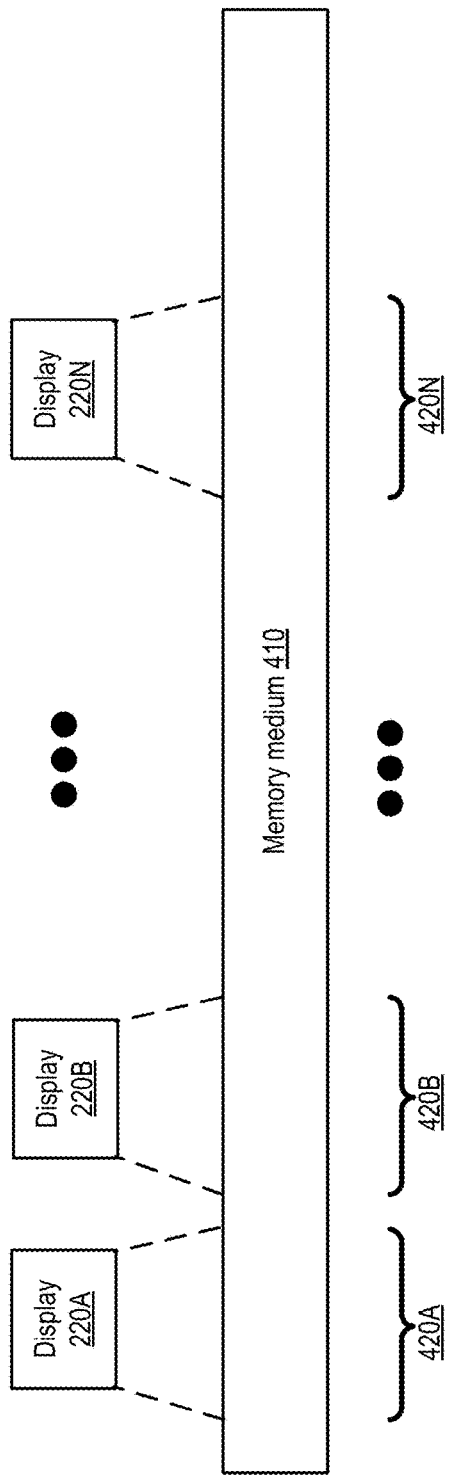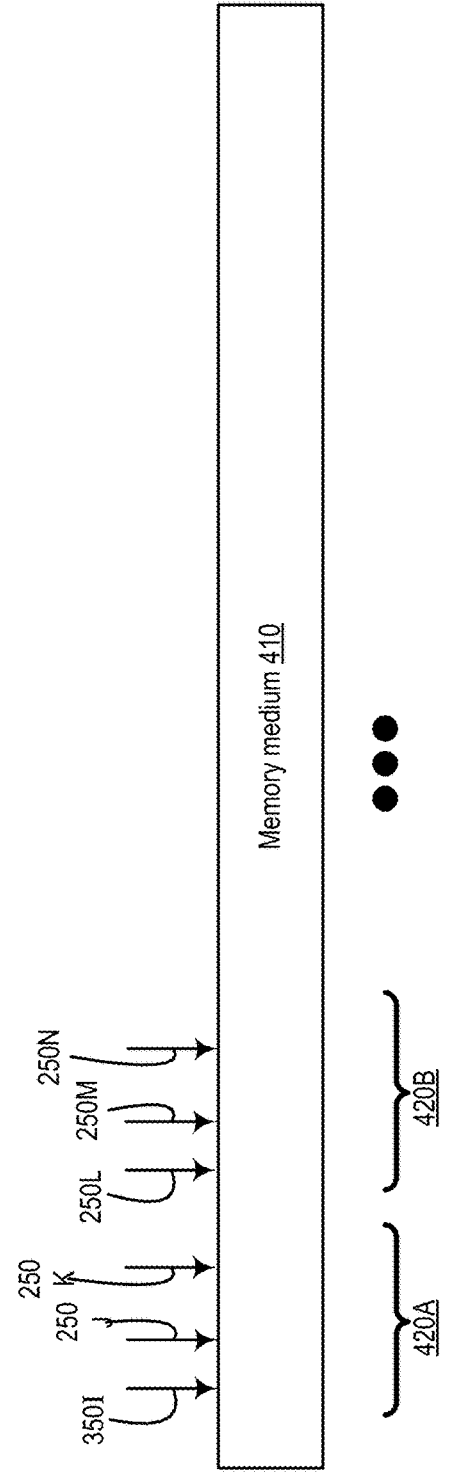

SYSTEM AND METHOD OF DETERMINING ATTRIBUTES OF A WORKSPACE CONFIGURATION BASED ON EYE GAZE OR HEAD POSE

BACKGROUND

Field of the Disclosure

This disclosure relates generally to information handling systems and more particularly to determining attributes of a workspace configuration based on eye gaze or head pose.

Description of the Related Art

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

SUMMARY

In one or more embodiments, one or more systems, one or more methods, and/or one or more processes may receive first reflections of light emissions off an eye of a user; may determine, based at least on the first reflections of light emissions off the eye of the user, first multiple vectors from the eye of the user to a first display of multiple displays of a workspace configuration; may receive second reflections of light emissions off the eye of the user; may determine, based at least on the second reflections of light emissions off the eye of the user, second multiple vectors from the eye of the user to a second display of the multiple displays of the workspace configuration; may determine physical dimensions of the first display based at least on the first multiple vectors; may determine physical dimensions of the second display based at least on the second multiple vectors; may determine a physical location of the first display based at least on the first multiple vectors; may determine a physical location of the second display based at least on the second multiple vectors; may determine that the eye of the user is looking at a non-display space; and in response to determining that the eye of the user is looking at the non-display space, may perform a process.

In one or more embodiments, the first display may be coupled to a first information handling system, and a second information handling system, different from the first information handling system, may include the second display. In one or more embodiments, the non-display space may include a physical space between the first display and the second display. In one or more embodiments, the non-display space may include a logo affixed to the first display, the second display, or an information handling system.

In one or more embodiments, the one or more systems, one or more methods, and/or one or more processes may further determine first multiple images of the eye of the user. For example, to determine the first multiple vectors, the one or more systems, one or more methods, and/or one or more processes may further determine the first multiple vectors based at least on the first multiple images of the eye of the user. In one or more embodiments, the one or more systems, one or more methods, and/or one or more processes may further determine a second multiple images of the eye of the user. For example, to determine the second multiple vectors, the one or more systems, one or more methods, and/or one or more processes may further determine the second multiple vectors based at least on the second multiple images of the eye of the user. In one or more embodiments, each image of the first multiple images may include reflections of a pattern of light emissions off the eye of the user and a pupil of the eye of the user. For example, to determine the first multiple vectors based at least on the first multiple images of the eye of the user, the one or more systems, one or more methods, and/or one or more processes may further compare the pattern of light emissions off the eye of the user with the pupil of the eye of the user.

In one or more embodiments, to determine the first multiple vectors based at least on the first multiple images of the eye of the user, the one or more systems, one or more methods, and/or one or more processes may further determine a center of a pupil of the eye of the user in the first multiple images. In one or more embodiments, to determine the second multiple vectors based at least on the second multiple images of the eye of the user, the one or more systems, one or more methods, and/or one or more processes may further determine the center of the pupil of the eye of the user in the second multiple images. In one or more embodiments, the one or more systems, one or more methods, and/or one or more processes may further determine multiple first head pose vectors and may further determine multiple second head pose vectors. For example, determining the physical location of the first display may be further based on the multiple first head pose vectors, and determining the physical location of the second display may be further based on the multiple second head pose vectors.

BRIEF DESCRIPTION OF THE DRAWINGS

For a more complete understanding of the present disclosure and its features/advantages, reference is now made to the following description, taken in conjunction with the accompanying drawings, which are not drawn to scale, and in which:

FIG. 4A illustrates an example of mapping displays to a memory medium, according to one or more embodiments;

FIG. 4B illustrates an example of mapping vectors to a memory medium, according to one or more embodiments.

DETAILED DESCRIPTION

Figure 1:
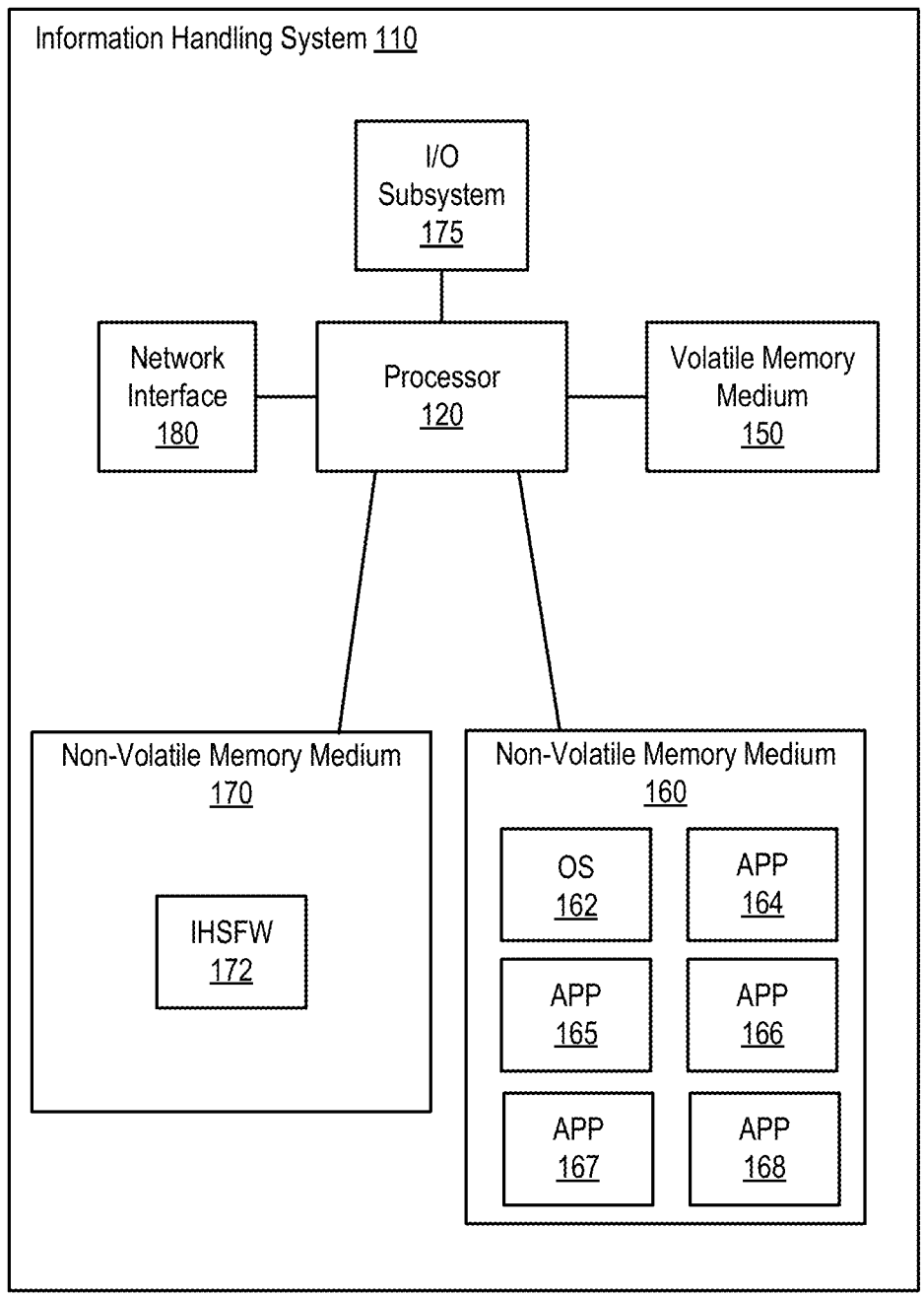
FIG. 1 illustrates an example of an information handling system, according to one or more embodiments.

In the following description, details are set forth by way of example to facilitate discussion of the disclosed subject matter. It should be apparent to a person of ordinary skill in the field, however, that the disclosed embodiments are examples and not exhaustive of all possible embodiments.

As used herein, a reference numeral refers to a class or type of entity, and any letter following such reference numeral refers to a specific instance of a particular entity of that class or type. Thus, for example, a hypothetical entity referenced by '12A' may refer to a particular instance of a particular class/type, and the reference '12' may refer to a collection of instances belonging to that particular class/type or any one instance of that class/type in general.

In one or more embodiments, user productivity may be increased to a state of optimal user productivity. In one or more embodiments, hardware and software may work together to orchestrate a workspace that may minimize an amount of time where user productivity is increased to a state of optimal user productivity. For example, a user may spend time configuring a workspace to increase productivity of the user. For instance, the user may spend the time configuring one or more positions of one or more windows (e.g., one or more windows of one or more applications) at one or more user preferred locations on one or more displays of a workspace configuration. In one or more embodiments, if the user switches or changes from a first context to a second context and/or changes from a first workspace configuration to a second workspace configuration, the user may spend additional time configuring one or more positions of one or more windows at one or more user preferred locations on one or more displays associated with the second context and/or the second workspace configuration. For instance, when the user switches or changes from the first context to the second context and/or changes from the first workspace configuration to the second workspace configuration, the additional time configuring the one or more positions of the one or more windows at the one or more user preferred locations on the one or more displays associated with the second context and/or the second workspace configuration may be a barrier to productivity.

In one or more embodiments, a user may utilize a workspace configuration. For example, a workspace configuration may include multiple windows (e.g., windows of one or more applications) displayed on one or more displays. In one instance, a workspace configuration may include multiple windows displayed on a single display. In another instance, a workspace configuration may include multiple windows displayed on multiple displays. In one or more embodiments, the user may utilize multiple workspace configurations. In one example, the user may utilize a first workspace configuration during a first amount of time transpiring. In another example, the user may utilize a second workspace configuration during a second amount of time transpiring. For instance, the second amount of time transpiring may occur after the first amount of time transpiring.

In one or more embodiments, a workspace configuration may be associated with a system. In one example, a first workspace configuration may include a first information handling system and/or first one or more displays. In a second example, a second workspace configuration may include a second information handling system, different from the first information handling system, and/or second one or more displays, different from the first one or more displays. For instance, at least one of the second one or more displays may be different from at least one of the first one or more displays. In third example, a first workspace configuration may include an information handling system and first one or more displays. In another example, a second workspace configuration may include the information handling system and second one or more displays, different from the first one or more displays. In one instance, at least one of the second one or more displays may be different from at least one of the first one or more displays. In another instance, the information handling system may be a portable information handling system (e.g., a laptop information handling system, a tablet information handling system, etc.).

In one or more embodiments, workspace configuration data may include information associated with one or more executing applications (e.g., one or more applications that are "open") and associated one or more window positions. In one or more embodiments, the workspace configuration data may include information associated with hardware associated with an information handling system. In one example, the hardware associated with the information handling system may include one or more devices associated with the information handling system and/or one or more peripheral devices, among others. In one instance, a device associated with the information handling system may include a processor. In a second instance, a device associated with the information handling system may include a graphics processor unit. In a third instance, a device associated with the information handling system may include a display. In a fourth instance, a device associated with the information handling system may include a touch screen. In a fifth instance, a peripheral device may include a mouse. In a sixth instance, a peripheral device may include a touchpad. In another instance, a peripheral device may include a stylus. In another example, the workspace configuration data may include information associated with one or more device postures. For instance, information associated with a device posture may include an angle of a lid of a portable information handling system with respect to a chassis of the portable information handling system. In one or more embodiments, the lid of the portable information handling system may include a display.

In one or more embodiments, an arrangement of displays of a workspace configuration may be determined. For example, physical locations of displays of a workspace configuration may be determined. In one or more embodiments, physical objects and virtual objects associated with a workspace configuration may be mapped to a relative position scheme. In one example, an eye gaze tracking system may be utilized to act on objects associated with the relative position scheme. In another example, a head tracking system may be utilized to act on objects associated with the relative position scheme. For instance, the head tracking system may determine movements of a head of a user.

In one or more embodiments, the head tracking system may track a face of the user. In one example, the head tracking system may utilize one or more facial recognition systems, one or more facial recognition methods, and/or one or more facial recognition processes in tracking the face of the user. In a second example, the head tracking system may utilize one or more face detection systems, one or more facial detection methods, and/or one or more facial detection processes in tracking the face of the user. For instance, the head tracking system may utilize a Viola-Jones face detection method. In another example, the head tracking system may track a face of the user utilizing face detection. For instance, the head tracking system may classify and track positions of facial features to determine one or more head pose vectors. In one or more embodiments, the head tracking system may be or include a head pose system.

In one or more embodiments, the head tracking system may determine one or more facial features of the face of the user. In one or more embodiments, the head tracking system may determine one or more head pose vectors based at least on the one or more facial features of the face of the user. For example, the one or more head pose vectors may indicate respective one or more directions that the face of the user is facing. In one instance, the one or more head pose vectors may indicate if the face of the user is straight forward, up, down, left, or right. In another instance, the one or more head pose vectors may indicate if the face of the user is angled towards a left shoulder of the user or is angled towards a right shoulder of the user.

In one or more embodiments, an eye gaze tracking system and/or a head tracking system may be utilized in determining an arrangement of displays of a workspace configuration. In one example, determining the arrangement of displays of the workspace configuration may include a configuration process. In another example, determining the arrangement of displays of the workspace configuration may include a statistical analysis.

In one or more embodiments, multiple vectors may be determined. For example, the multiple vectors may be utilized as points of reference to determine a viewport of a user for each of the displays of the workspace configuration. In one instance, the multiple vectors may be utilized as points of reference to determine respective locations of each viewport for each of the displays. In another instance, the multiple vectors may be utilized as points of reference to determine respective orientations of each viewport for each of the displays.

In one or more embodiments, user input may be collected. For example, the user input may include pointer movements (e.g., mouse movements, trackball movements, touchpad movements, stylus movements, etc.) as the user utilizes the workspace configuration. For example, it may be assumed that the user gazed at locations associated with the user input. For instance, physical locations of the displays of the workspace configuration may be determined based at least on the user input and based at least on data from the eye tracking system and/or the head tracking system.

In one or more embodiments, collecting the user input may include user input data. In one example, collecting user input data may include collecting data associated with user input locations (e.g., cursor positions, pointer positions, etc.). In a second example, collecting user input data may include collecting data associated with pixel locations where input is placed on a display. In another example, collecting user input data may include collecting data associated with gaze vectors. In one or more embodiments, the user input data may be utilized in determining a three-dimensional sector that eyes of the user are looking at. In one or more embodiments, the user input data may be stored via a historical database.

In one or more embodiments, an eye of a user may be tracked via one or more infrared (IR) sensors. In one or more embodiments, an eye of a user may be tracked via one or more near IR sensors. In one or more embodiments, an eye of a user may be tracked via one or more cameras. For example, a camera may include one or more image sensors. In one or more embodiments, light may be reflected from an eye of a user. In one example, the light may be in an IR light spectrum. In a second example, the light may be in a near IR light spectrum. In another example, the light may be in a visible light spectrum. In one or more embodiments, one or more sensors may determine data, based at least on the light reflected from the eye of the user, associated with the eye of the user. For example, the data associated with the eye of the user may include information associated with one or more of a presence of the eye of the user, a focus of the eye of the user, an attention of the eye of the user, a position of the eye of the user, and a pupil size of the eye of the user, among others. In one or more embodiments, an eye tracking device may include one or more IR sensors, one or more IR light emitters, one or more near IR light emitters, one or more near IR sensors, and/or one or more cameras, among others. In one or more embodiments, an eye tracking device may provide a pattern of light emissions to the eye of the user. For example, one or more light emitters of the eye tracking device may provide a pattern of light to the eye of the user. In one or more embodiments, the eye tracking device may determine where the eye of the user is looking based at least on the pattern of light and an image of a pupil of the eye of the user. For example, determining where the eye of the user is looking based at least on the pattern of light and an image of the pupil of the eye of the user may include comparing the pattern of light reflected from the eye of the user and the image of the pupil of the eye of the user.

In one or more embodiments, one or more distances from an eye tracking device and/or a head tracking device may be determined. For example, the eye tracking device and/or the head tracking device may include one or more time-of-flight systems and/or processes. In one or more embodiments, a physical size of a display may be determined. For example, a physical size of a display may be determined from data associated with the display. For instance, the data associated with the display may include physical dimensions of the display. In one or more embodiments, determining attributes associated with a display may include receiving Extended Display Identification Data (EDID) that describe capabilities of the display. For example, the EDID may include one or more of a manufacturer name, a serial number, a product type, a filter type, timings supported by the display, a size of the display, luminance data, and pixel mapping data, among others.

In one or more embodiments, a physical location of the display may be determined based at least on the one or more distances from the eye tracking device and/or the head tracking device and based at least on the physical size of the display. In one or more embodiments, a display may include a screen that produces light emissions. In one or more embodiments, a display may include a projector that produces light emissions. In one or more embodiments, a model (e.g., an artificial intelligence model) may be trained to determine one or more physical locations of respective one or more displays. For example, a physical location of a display may include a position associated with a x-axis, a y-axis, and a z-axis. For instance, the physical location of the display may include a (x, y, z) position. In one or more embodiments, an origin may be associated with the eye tracking device. For example, (0, 0, 0) may be located at the eye tracking device or may be the eye tracking device.

In one or more embodiments, the model may be trained to determine one or more orientations of respective one or more displays. In one example, an orientation of a display may include an angle of a plane of a display with respect to an axis. In another example, an orientation of a display may include a portrait or a landscape positioning of the display. In one or more embodiments, additional user input data may be collected. For example, the model may be updated based at least on the additional user input data. In one or more embodiments, a change in a position of a display may be determined based at least on the additional user input data.

In one or more embodiments, a configuration method may be utilized in determining locations of displays of a workspace configuration. For example, the configuration method may include displaying a graphic at positions of each display of the displays of the workspace configuration and utilize an eye tracking device to determine where a user is looking, assuming that the user is looking at the graphic at the positions of each of the displays of the workspace configuration. In one instance, an eye tracking device may determine a gaze vector. In another instance, a head tracking device may determine a head pose vector. In one or more embodiments, displaying the graphic may include displaying the graphical edges of each display of the displays of the workspace configuration. In one or more embodiments, if a display is in landscape orientation, then a gaze vector order may move in directions of right, left, down, and up.

In one or more embodiments, determining a location of each display of a workspace configuration may include determining two vectors that are closest between two displays of the workspace configuration. For example, determining two vectors that are closest between two displays of the workspace configuration may include determining a normalized first vector associated with a first display of the two displays and a normalized second vector associated with a second display of the two displays, where a dot product (e.g., an inner product) of the normalized first vector and the normalized second vector is closest to one (1).

In one or more embodiments, physical locations of the displays of the workspace configuration may be determined. In one or more embodiments, offsets associated with the physical locations of the displays of the workspace configuration may be determined. For example, memory offsets associated with the physical locations of the displays of the workspace configuration may be determined. For instance, the memory offsets may include memory addresses that may be utilized in displaying information via the displays. In one or more embodiments, an arrangement of the displays may be determined via the memory offsets.

In one or more embodiments, "drift" may mean that a user moves in physical space away from a configured position. For example, if drift occurs, viewport regions may be transformed based at least on an offset with an initial determination of physical locations of displays of a workspace configuration. In one or more embodiments, viewport regions may be transformed based at least on an offset with an initial determination of physical locations of displays of a workspace configuration when multiple users utilize the workspace configuration.

Turning now to FIG. 1, an example of an information handling system is illustrated, according to one or more embodiments. An information handling system (IHS) 110 may include a hardware resource or an aggregate of hardware resources operable to compute, classify, process, transmit, receive, retrieve, originate, switch, store, display, manifest, detect, record, reproduce, handle, and/or utilize various forms of information, intelligence, or data for business, scientific, control, entertainment, or other purposes, according to one or more embodiments. For example, IHS 110 may be a personal computer, a desktop computer system, a laptop computer system, a server computer system, a mobile device, a tablet computing device, a personal digital assistant (PDA), a consumer electronic device, an electronic music player, an electronic camera, an electronic video player, a wireless access point, a network storage device, or another suitable device and may vary in size, shape, performance, functionality, and price. In one or more embodiments, a portable IHS 110 may include or have a form factor of that of or similar to one or more of a laptop, a notebook, a telephone, a tablet, and a PDA, among others. For example, a portable IHS 110 may be readily carried and/or transported by a user (e.g., a person). In one or more embodiments, components of IHS 110 may include one or more storage devices, one or more communications ports for communicating with external devices as well as various input and output (I/O) devices, such as a keyboard, a mouse, and a video display, among others. In one or more embodiments, IHS 110 may include one or more buses operable to transmit communication between or among two or more hardware components. In one example, a bus of IHS 110 may include one or more of a memory bus, a peripheral bus, and a local bus, among others. In another example, a bus of IHS 110 may include one or more of a Micro Channel Architecture (MCA) bus, an Industry Standard Architecture (ISA) bus, an Enhanced ISA (EISA) bus, a Peripheral Component Interconnect (PCI) bus, HyperTransport (HT) bus, an inter-integrated circuit ($I^2C$) bus, a serial peripheral interface (SPI) bus, a low pin count (LPC) bus, an enhanced serial peripheral interface (eSPI) bus, a universal serial bus (USB), a system management bus (SMBus), and a Video Electronics Standards Association (VESA) local bus, among others.

In one or more embodiments, IHS 110 may include firmware that controls and/or communicates with one or more hard drives, network circuitry, one or more memory devices, one or more I/O devices, and/or one or more other peripheral devices. For example, firmware may include software embedded in an IHS component utilized to perform tasks. In one or more embodiments, firmware may be stored in non-volatile memory, such as storage that does not lose stored data upon loss of power. In one example, firmware associated with an IHS component may be stored in non-volatile memory that is accessible to one or more IHS components. In another example, firmware associated with an IHS component may be stored in non-volatile memory that may be dedicated to and includes part of that component. For instance, an embedded controller may include firmware that may be stored via non-volatile memory that may be dedicated to and includes part of the embedded controller.

As shown, IHS 110 may include a processor 120, a volatile memory medium 150, non-volatile memory media 160 and 170, an I/O subsystem 175, and a network interface 180. As illustrated, volatile memory medium 150, non-volatile memory media 160 and 170, I/O subsystem 175, and network interface 180 may be communicatively coupled to processor 120.

In one or more embodiments, one or more of volatile memory medium 150, non-volatile memory media 160 and 170, I/O subsystem 175, and network interface 180 may be communicatively coupled to processor 120 via one or more buses, one or more switches, and/or one or more root complexes, among others. In one example, one or more of volatile memory medium 150, non-volatile memory media 160 and 170, I/O subsystem 175, and network interface 180 may be communicatively coupled to processor 120 via one or more PCI-Express (PCIe) root complexes. In another example, one or more of an I/O subsystem 175 and a network interface 180 may be communicatively coupled to processor 120 via one or more PCIe switches.

In one or more embodiments, the term "memory medium" may mean a "storage device", a "memory", a "memory device", a "tangible computer readable storage medium", and/or a "computer-readable medium". For example, computer-readable media may include, without limitation, storage media such as a direct access storage device (e.g., a hard disk drive, a floppy disk, etc.), a sequential access storage device (e.g., a tape disk drive), a compact disk (CD), a CD-ROM, a digital versatile disc (DVD), a random access memory (RAM), a read-only memory (ROM), a one-time programmable (OTP) memory, an electrically erasable programmable read-only memory (EEPROM), and/or a flash memory, a solid state drive (SSD), or any combination of the foregoing, among others.

In one or more embodiments, one or more protocols may be utilized in transferring data to and/or from a memory medium. For example, the one or more protocols may include one or more of small computer system interface (SCSI), Serial Attached SCSI (SAS) or another transport that operates with the SCSI protocol, advanced technology attachment (ATA), serial ATA (SATA), a USB interface, an Institute of Electrical and Electronics Engineers (IEEE) 1394 interface, a Thunderbolt interface, an advanced technology attachment packet interface (ATAPI), serial storage architecture (SSA), integrated drive electronics (IDE), or any combination thereof, among others.

Volatile memory medium 150 may include volatile storage such as, for example, RAM, DRAM (dynamic RAM), EDO RAM (extended data out RAM), SRAM (static RAM), etc. One or more of non-volatile memory media 160 and 170 may include nonvolatile storage such as, for example, a read only memory (ROM), a programmable ROM (PROM), an erasable PROM (EPROM), an electrically erasable PROM, NVRAM (non-volatile RAM), ferroelectric RANI (FRAM), a magnetic medium (e.g., a hard drive, a floppy disk, a magnetic tape, etc.), optical storage (e.g., a CD, a DVD, a BLU-RAY disc, etc.), flash memory, a SSD, etc. In one or more embodiments, a memory medium can include one or more volatile storages and/or one or more nonvolatile storages.

In one or more embodiments, network interface 180 may be utilized in communicating with one or more networks and/or one or more other information handling systems. In one example, network interface 180 may enable IHS 110 to communicate via a network utilizing a suitable transmission protocol and/or standard. In a second example, network interface 180 may be coupled to a wired network. In a third example, network interface 180 may be coupled to an optical network. In another example, network interface 180 may be coupled to a wireless network.

In one or more embodiments, network interface 180 may be communicatively coupled via a network to a network storage resource. For example, the network may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, an Internet or another appropriate architecture or system that facilitates the communication of signals, data and/or messages (generally referred to as data). For instance, the network may transmit data utilizing a desired storage and/or communication protocol, including one or more of Fibre Channel, Frame Relay, Asynchronous Transfer Mode (ATM), Internet protocol (IP), other packet-based protocol, Internet SCSI (iSCSI), or any combination thereof, among others.

In one or more embodiments, processor 120 may execute processor instructions in implementing one or more systems, one or more flowcharts, one or more methods, and/or one or more processes described herein. In one example, processor 120 may execute processor instructions from one or more of memory media 150, 160, and 170 in implementing one or more systems, one or more flowcharts, one or more methods, and/or one or more processes described herein. In another example, processor 120 may execute processor instructions via network interface 180 in implementing one or more systems, one or more flowcharts, one or more methods, and/or one or more processes described herein.

In one or more embodiments, processor 120 may include one or more of a system, a device, and an apparatus operable to interpret and/or execute program instructions and/or process data, among others, and may include one or more of a microprocessor, a microcontroller, a digital signal processor (DSP), an application specific integrated circuit (ASIC), and another digital or analog circuitry configured to interpret and/or execute program instructions and/or process data, among others. In one example, processor 120 may interpret and/or execute program instructions and/or process data stored locally (e.g., via memory media 150, 160, and 170 and/or another component of IHS 110). In another example, processor 120 may interpret and/or execute program instructions and/or process data stored remotely (e.g., via a network storage resource).

In one or more embodiments, I/O subsystem 175 may represent a variety of communication interfaces, graphics interfaces, video interfaces, user input interfaces, and/or peripheral interfaces, among others. For example, I/O subsystem 175 may include one or more of a touch panel and a display adapter, among others. For instance, a touch panel may include circuitry that enables touch functionality in conjunction with a display that is driven by a display adapter.

As shown, non-volatile memory medium 160 may include an operating system (OS) 162, and applications (APPs) 164-168. In one or more embodiments, one or more of OS 162 and APPs 164-168 may include processor instructions executable by processor 120. In one example, processor 120 may execute processor instructions of one or more of OS 162 and APPs 164-168 via non-volatile memory medium 160. In another example, one or more portions of the processor instructions of the one or more of OS 162 and APPs 164-168 may be transferred to volatile memory medium 150, and processor 120 may execute the one or more portions of the processor instructions of the one or more of OS 162 and APPs 164-168 via volatile memory medium 150.

As illustrated, non-volatile memory medium 170 may include information handling system firmware (IHSFW) 172. In one or more embodiments, IHSFW 172 may include processor instructions executable by processor 120. For example, IHSFW 172 may include one or more structures and/or one or more functionalities of and/or compliant with one or more of a basic input/output system (BIOS), an Extensible Firmware Interface (EFI), a Unified Extensible Firmware Interface (UEFI), and an Advanced Configuration and Power Interface (ACPI), among others. In one instance, processor 120 may execute processor instructions of IHSFW 172 via non-volatile memory medium 170. In another instance, one or more portions of the processor instructions of IHSFW 172 may be transferred to volatile memory medium 150, and processor 120 may execute the one or more portions of the processor instructions of IHSFW 172 via volatile memory medium 150.

In one or more embodiments, processor 120 and one or more components of IHS 110 may be included in a system-on-chip (SoC). For example, the SoC may include processor 120 and a platform controller hub (not specifically illustrated).

Figure 2A:
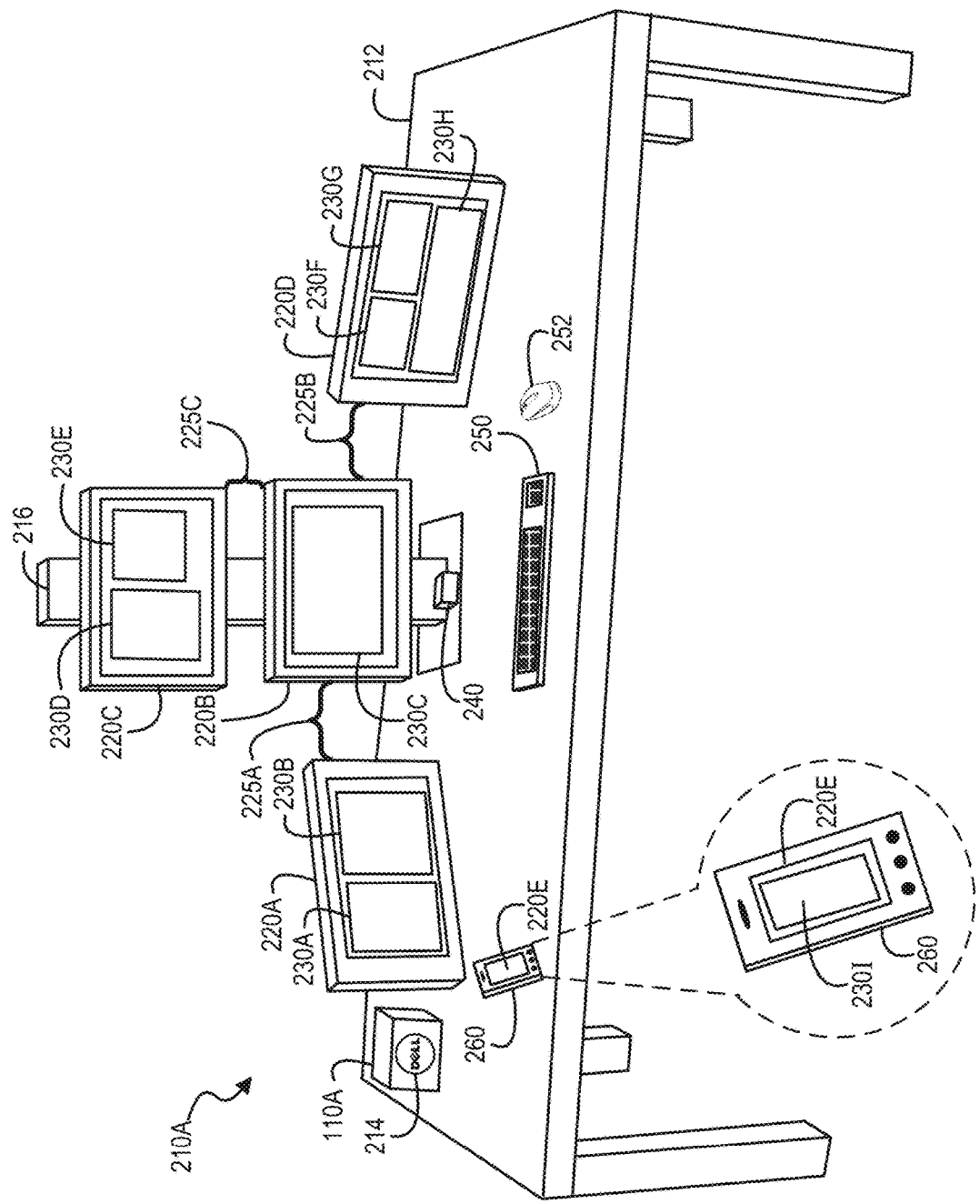
FIG. 2A illustrates an example of a workspace configuration, according to one or more embodiments.

Turning now to FIG. 2A, an example of a workspace configuration is illustrated, according to one or more embodiments. As shown, a workspace configuration 210A may include displays 220A-220D. In one or more embodiments, workspace configuration 210A may include an IHS 110A. As shown, IHS 110A may lay on table 212. In one or more embodiments, table 212 may be or include a desk. As shown, displays 220A and 220D may lay on a table 212. In one or more embodiments, workspace configuration 210A may include table 212. In one or more embodiments, workspace configuration 210A may not include table 212.

In one or more embodiments, IHS 110A may include a logo 214. For example, IHS 110A may have logo 214 on a chassis of IHS 110A. For instance, logo 214 may be affixed to the chassis of IHS 110A. In one or more embodiments, a logo may be affixed to a display 220. In one or more embodiments, displays 220A-220D may be coupled to IHS 110A. In one example, one or more of displays 220A-220D may be coupled to IHS 110A in a wireless fashion. In another example, one or more of displays 220A-220D may be coupled to IHS 110A in a wired fashion. In one or more embodiments, displays 220A-220D may be at respective physical locations. In one example, display 220A may be at a first physical location. In a second example, display 220B may be at a second physical location, different from the first physical location. In a third example, display 220C may be at a third physical location, different from the first physical location and different from the second physical location. In another example, display 220D may be at a fourth physical location, different from the first physical location, different from the second physical location, and different from the third physical location.

In one or more embodiments, a graphical user interface (GUI) associated with an application may be displayed via a display area of a display. For example, the GUI associated with the application may include one or more windows. As illustrated, display 220A may include display areas 230A and 230B. In one example, display areas 230A and 230B may display windows of a single application. For instance, display areas 230A and 230B may display two windows of application (APP) 164. In another example, display areas 230A and 230B may display windows of two different applications. In one instance, display area 230A may display a window of APP 164. In another instance, display area 230B may display a window of APP 165. Although not specifically illustrated, display 220A may include a single display area, according to one or more embodiments.

As shown, display 220B may include display area 230C. For example, display area 230C may display a window of an application. In one instance, display area 230C may display a window of APP 164. In a second instance, display area 230C may display a window of APP 165. In another instance, display area 230C may display a window of APP 166. Although not specifically illustrated, display 220B may include multiple display areas, according to one or more embodiments.

As illustrated, displays 220B and 220C may be mounted to a mast 216. In one or more embodiments, mast 216 may lay on table 212. In one or more embodiments, mast 216 may be fixed to table 212. In one or more embodiments, mast 216 may be fastened to table 212. As shown, display 220C may be located above display 220B. As illustrated, display 220B may include a display area 230C. For example, display areas 230C may display a window of an application (e.g., one of APPs 164-168). As shown, display 220D may include display areas 230D and 230E. In one example, display areas 230D and 230E may display windows of an application (e.g., one of APPs 164-168). In another example, display areas 230D and 230E may display windows of respective two different applications (e.g., two of APPs 164-168).

As shown, display 220D may include display areas 230F-230H. In one example, display areas 230D-230F may display windows of a single application. In one instance, display areas 230D-230F may display three windows of APP 164. In a second instance, display areas 230D-230F may display three windows of APP 165. In a third instance, display areas 230F-230H may display three windows of APP 166. In another instance, display areas 230F-230H may display three windows of APP 167. In a second example, display areas 230F-230H may display windows of three different applications. In one instance, display area 230F may display a window of APP 164. In a second instance, display area 230G may display a window of APP 165. In a third instance, display area 230H may display a window of APP 166. In a fourth instance, display area 230H may display a window of APP 167. In another instance, display area 230H may display a window of APP 168. In another example, two of display areas 230F-230H may display windows of a first application, and the other of display areas 230D-230F may display windows of a second application, different from the first application. In one instance, display areas 230F and 230G may display windows of APP 164, and display area 230H may display a window of APP 165. In a second instance, display areas 230F and 230G may display windows of APP 164, and display area 230H may display a window of APP 167. In another instance, display areas 230F and 230G may display windows of APP 167, and display area 230H may display a window of APP 168. Although not specifically illustrated, display 220D may include a single display area, according to one or more embodiments.

As illustrated, display 220A may be a physical distance 225A from display 220B. In one example, display 220A may be physical distance 225A left of display 220B. In another example, display 220B may be physical distance 225A right of display 220A. As shown, display 220B may be a physical distance 225B from display 220D. In one example, display 220B may be physical distance 225B left of display 220D. In another example, display 220D may be physical distance 225B right of display 220B. As illustrated, display 220B may be a physical distance 225C from display 220C. In one example, display 220B may be physical distance 225C below display 220C. In another example, display 220C may be physical distance 225C above display 220B. In one or more embodiments, a distance between a first display and a second display may not exist. For example, one or more of physical distances 225A-225C may be zero (0). For instance, there may be no gap between the first display and the second display.

As illustrated, workspace configuration 210A may include an eye tracking device 240. In one or more embodiments, eye tracking device 240 may lay on table 212. In one or more embodiments, eye tracking device 240 may be mounted on mast 216. For example, eye tracking device 240 may be fastened to mast 216. In one or more embodiments, eye tracking device 240 may be coupled to IHS 110A. In one example, eye tracking device 240 may be coupled to IHS 110A in a wired fashion. In another example, eye tracking device 240 may be coupled to IHS 110A in a wireless fashion. As shown, workspace configuration 210A may include a keyboard 250. In one or more embodiments, keyboard 250 may be coupled to IHS 110A. In one example, keyboard 250 may be coupled to IHS 110A in a wired fashion. In another example, keyboard 250 may be coupled to IHS 110A in a wireless fashion. As illustrated, workspace configuration 210A may include a pointing device 252 (e.g., a mouse). In one or more embodiments, pointing device 252 may be coupled to IHS 110A. In one example, pointing device 252 may be coupled to IHS 110A in a wired fashion. In another example, pointing device 252 may be coupled to IHS 110A in a wireless fashion.

As illustrated, an IHS 260 may lay on table 212. For example, IHS 260 may lay on a cradle that may lay on table 212. In one or more embodiments, IHS 260 may include one or more functionalities and/or one or more structures as those described with reference to IHS 110. In one or more embodiments, docking station 255 may implement at least a portion of one or more systems, one or more flowcharts, one or more methods, and/or one or more processes described herein. In one or more embodiments, IHS 260 may be a portable information handling system. For example, IHS 260 may include a wireless telephone (e.g., a cellular telephone, a satellite telephone, etc.), a PDA, an electronic music player, an electronic camera, an electronic video player, a mobile device, and/or a tablet computing device, among others. In one or more embodiments, IHS 260 may be coupled to IHS 110A. In one example, IHS 260 may be coupled to IHS 110A in a wireless fashion. In another example, IHS 260 may be coupled to IHS 110A in a wired fashion. In one or more embodiments, a process (e.g., a background process, an agent, a service, etc.) may be executed by IHS 260 to communicate with IHS 110A and/or other elements of workspace configuration 210A. In one or more embodiments, workspace configuration 210A may include IHS 260. As shown, IHS 260 may include a display 220E. As shown, display 220E may include display area 230I. For example, display area 230I may display a GUI of an application. For instance the GUI of the application may include a window of the application. Although not specifically illustrated, display 220E may include multiple display areas, according to one or more embodiments.

In one or more embodiments, a workspace may include multiple display areas displayed via one or more displays of a workspace configuration. In one example, a workspace may include display areas 230A-230H displayed via displays 220A-220D of workspace configuration 210A. In another example, a workspace may include display areas 230A-230I displayed via displays 220A-220E of workspace configuration 210A.

Figure 2B:
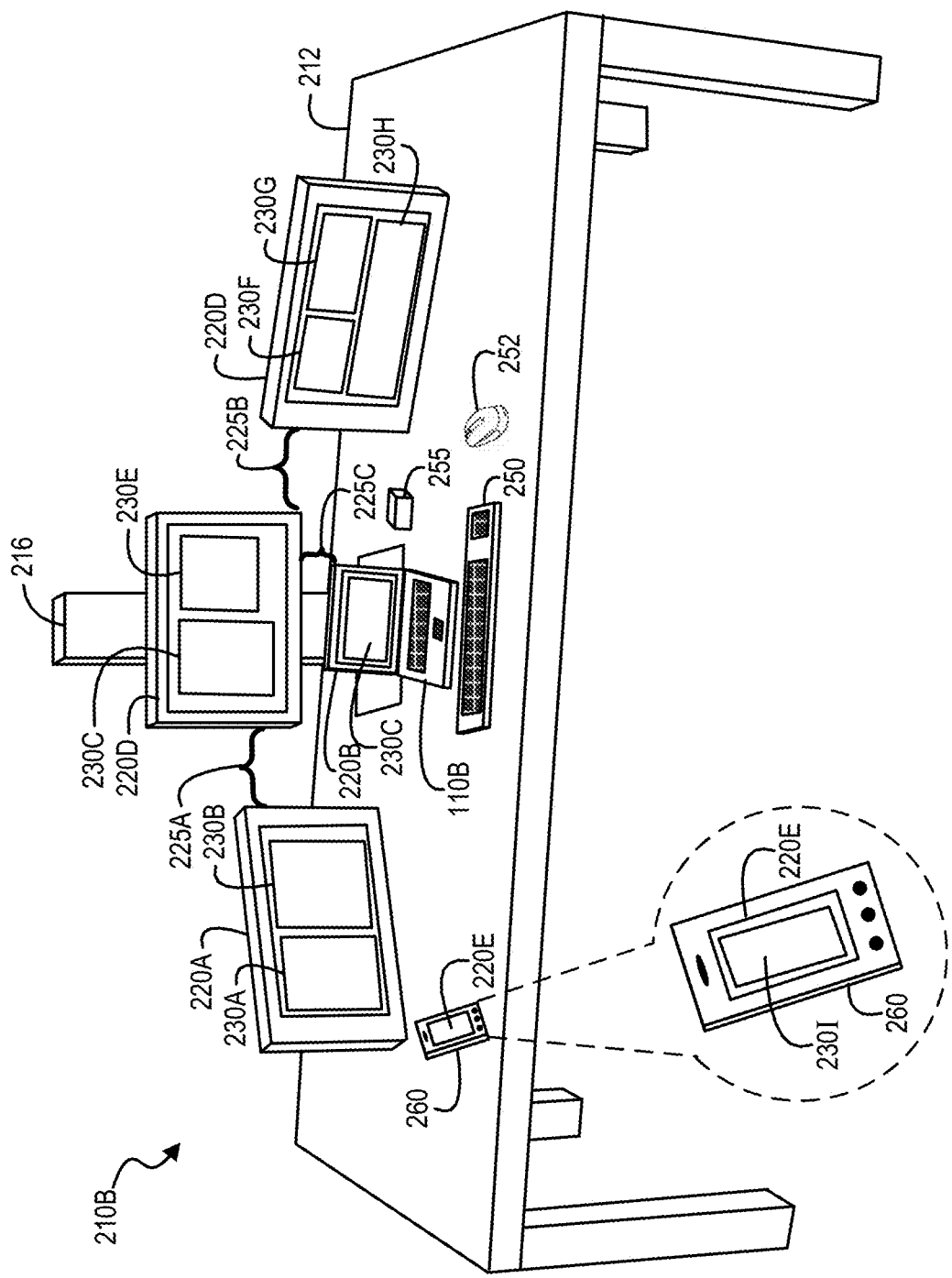
FIG. 2B illustrates a second example of a workspace configuration, according to one or more embodiments.

Turning now to FIG. 2B, a second example of a workspace configuration is illustrated, according to one or more embodiments. As shown, a workspace configuration 210B may include an IHS 110B. In one or more embodiments, IHS 110B may be a portable information handling system (e.g., a laptop information handling system, a notebook information handling system, etc.). In one or more embodiments, IHS 110B may lay on table 212. In one or more embodiments, IHS 110B may be coupled to a docking station 255. In one example, IHS 110B may be coupled to docking station 255 in a wired fashion. In another example, IHS 110B may be coupled to docking station 255 in a wireless fashion.

As shown, IHS 110B may include display 220. In one or more embodiments, workspace configuration 210B may include table 212, displays 220A, 220C, and 220D, keyboard 250, pointing device 252, docking station 255, and/or IHS 220E, among others. In one or more embodiments, keyboard 250, pointing device 252, IHS 260, and/or one or more of displays 220A, 220C, and 220D may be coupled to docking station 255. In one example, keyboard 250, pointing device 252, and/or one or more of displays 220A, 220C, and 220D may be coupled to docking station 255 in a wired fashion. In another example, keyboard 250, pointing device 252, and/or one or more of displays 220A, 220C, and 220D may be coupled to docking station 255 in a wireless fashion. In one or more embodiments, a process (e.g., a background process, an agent, a service, etc.) may be executed by IHS 260 to communicate with docking station 255 and/or other elements of workspace configuration 210B. In one or more embodiments, docking station 255 may include one or more structures and/or one or more functionalities as those described with reference to IHS 110. In one or more embodiments, docking station 255 may implement at least a portion of one or more systems, one or more flowcharts, one or more methods, and/or one or more processes described herein.

Although not specifically illustrated, IHS 110B may include an eye tracking device, according to one or more embodiments. In one or more embodiments, an eye tracking device of IHS 110B may include one or more functionalities and/or one or more structures as those described with reference to eye tracking device 240. Although not specifically illustrated, a user of IHS 110B may wear an eye tracking device. In one or more embodiments, a wearable eye tracking device may include one or more functionalities and/or one or more structures as those described with reference to eye tracking device 240. In one or more embodiments, a wearable eye tracking device may be coupled to IHS 110B. In one example, the wearable eye tracking device may be coupled to IHS 110B in a wired fashion. In another example, the wearable eye tracking device may be coupled to IHS 110B in a wireless fashion. In one or more embodiments, a wearable eye tracking device may be coupled to docking station 255. In one example, the wearable eye tracking device may be coupled to docking station 255 in a wired fashion. In another example, the wearable eye tracking device may be coupled to docking station 255 in a wireless fashion.

Figure 3B:
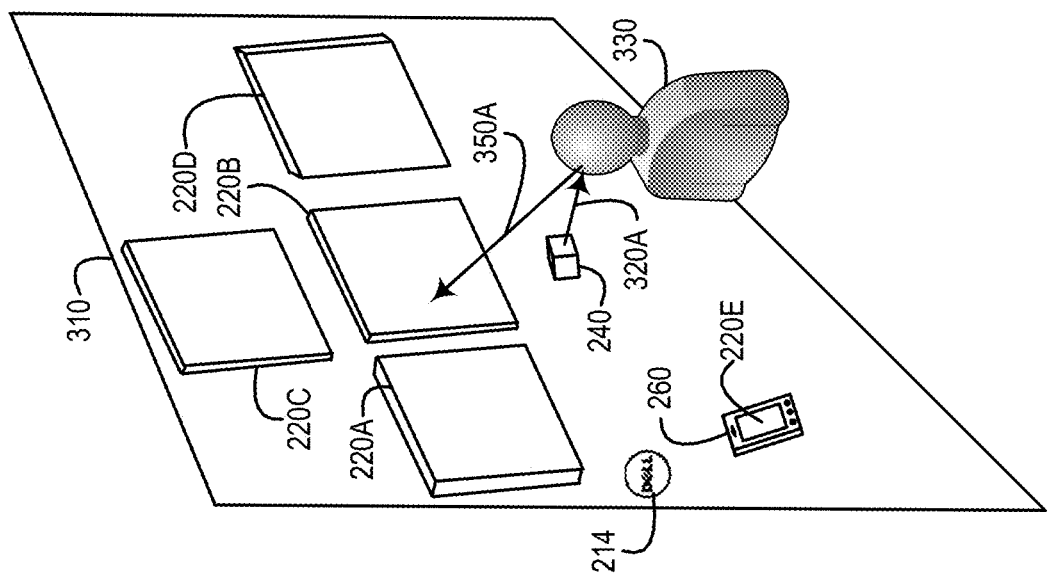
FIGS. 3A-3D illustrate examples of vectors associated with a user, according to one or more embodiments.
Figure 3A:
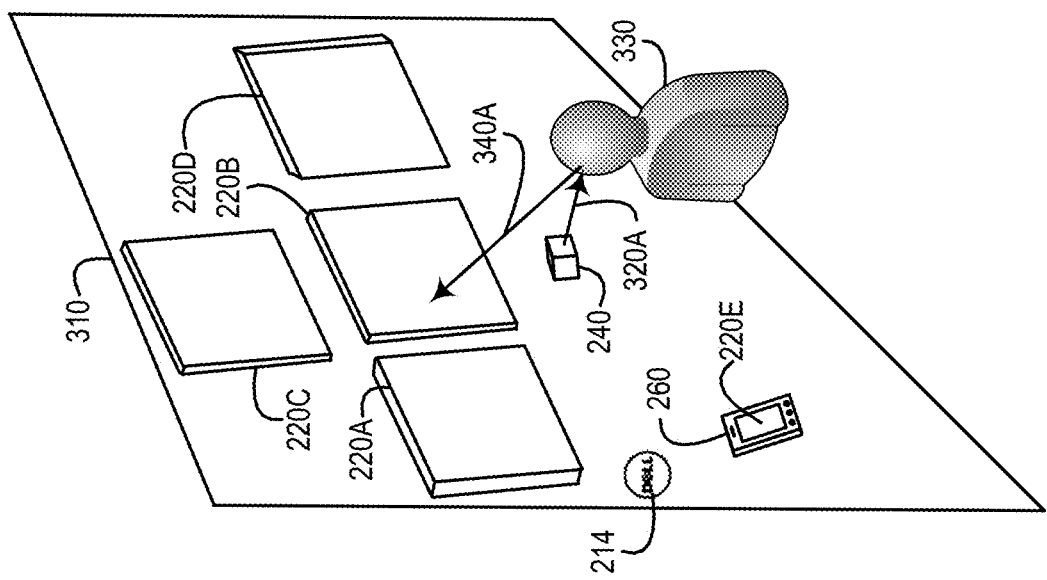

Turning now to FIGS. 3A-3D, examples of vectors associated with a user are illustrated, according to one or more embodiments. In one or more embodiments, a plane 310 may be associated with eye tracking device 240. For example, plane 310 may be parallel with a front of eye tracking device 240. In one or more embodiments, plane 310 may be an eye gaze tracking (EGT) plane. As shown in FIG. 3A, a vector 320A may be associated with eye tracking device 240 and a user 330. For example, vector 320A may represent a distance and a direction from eye tracking device 240 to an eye of user 330. In one or more embodiments, plane 310 and vector 320A may share an origin. For example, a vector may be referenced to an eye tracking device. For instance, the eye tracking device may be or include an origin. As illustrated, a vector 340A may be associated with eye tracking device 240 and plane 310. For example, vector 340A may represent a distance and a direction from an eye of user 330 to a location associated with plane 310.

As illustrated in FIG. 3B, a vector 350A may be associated with eye tracking device 240 and display 220B. For example, vector 350A may represent a distance and a direction from the eye of user 330 to a location associated with display 220B. In one instance, the location associated with display 220B may be a pixel of display 220B. In another instance, the location associated with display 220B may be a gaze point. In one or more embodiments, vector 350A may be based at least on vector 340A. For example, vector 350A may be derived from vector 340A. For instance, vector 350A may intersect plane 310 where vector 340A ends. In one or more embodiments, vector 350A may indicate where the eye of user 330 is looking on display 220B.

Figure 3D:
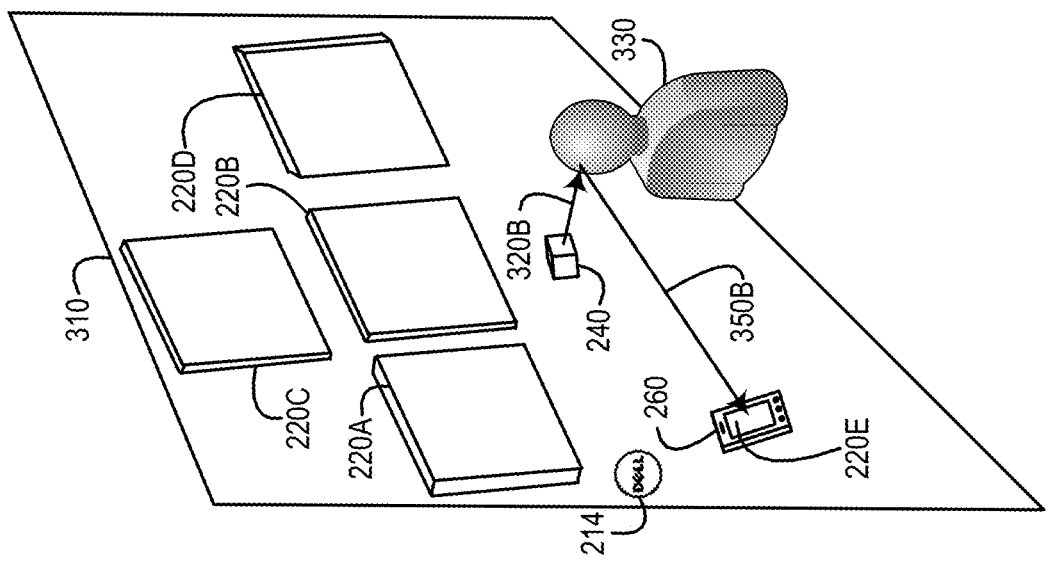
Figure 3C:
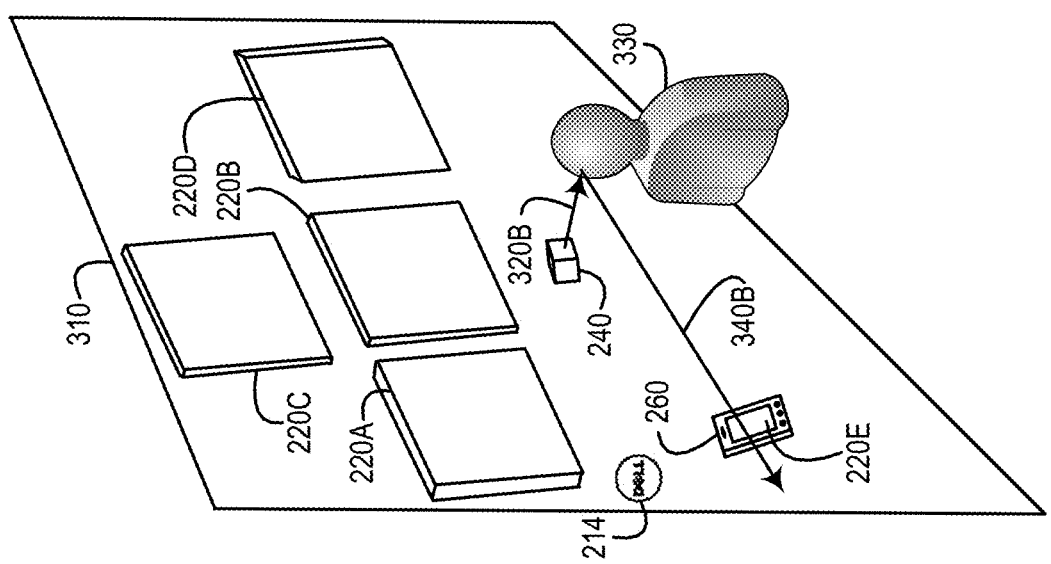

As shown in FIG. 3C, a vector 320B may be associated with eye tracking device 240 and user 330. For example, vector 320B may represent a distance and a direction from eye tracking device 240 to an eye of user 330. In one or more embodiments, plane 310 and vector 320B may share the origin. As illustrated, a vector 340B may be associated with eye tracking device 240 and plane 310. For example, vector 340B may represent a distance and a direction from the eye of user 330 to another location associated with plane 310.

As illustrated in FIG. 3D, a vector 350B may be associated with eye tracking device 240 and display 220E. For example, vector 350B may represent a distance and a direction from the eye of user 330 to a location associated with display 220E. In one or more embodiments, vector 350B may be based at least on vector 340B. For example, vector 350B may be derived from vector 340B. In one or more embodiments, vector 350B may indicate where the eye of user 330 is looking on display 220E.

Figure 3F:
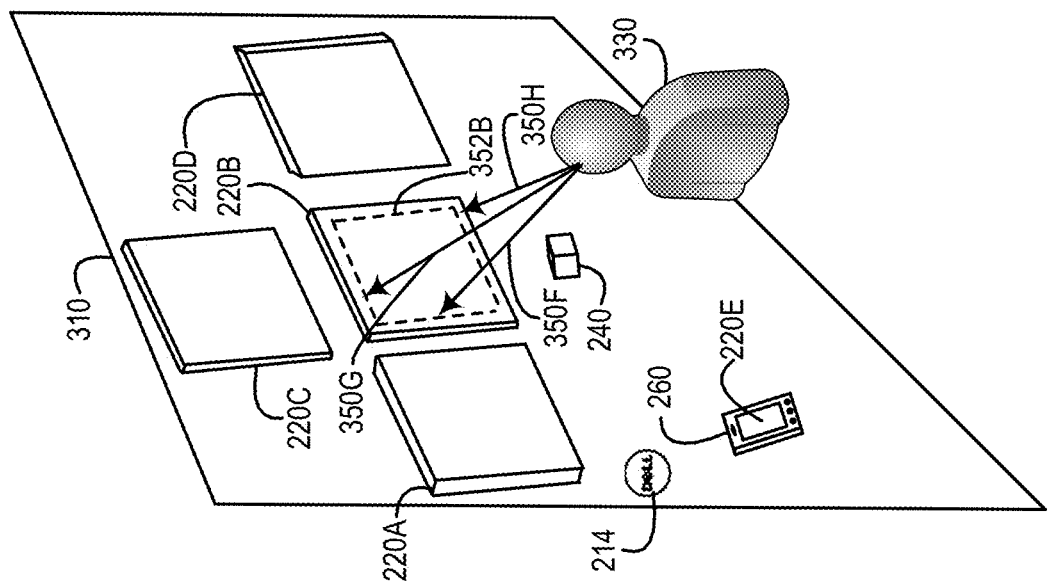
FIGS. 3E and 3F illustrate examples of determining locations of displays, according to one or more embodiments.
Figure 3E:
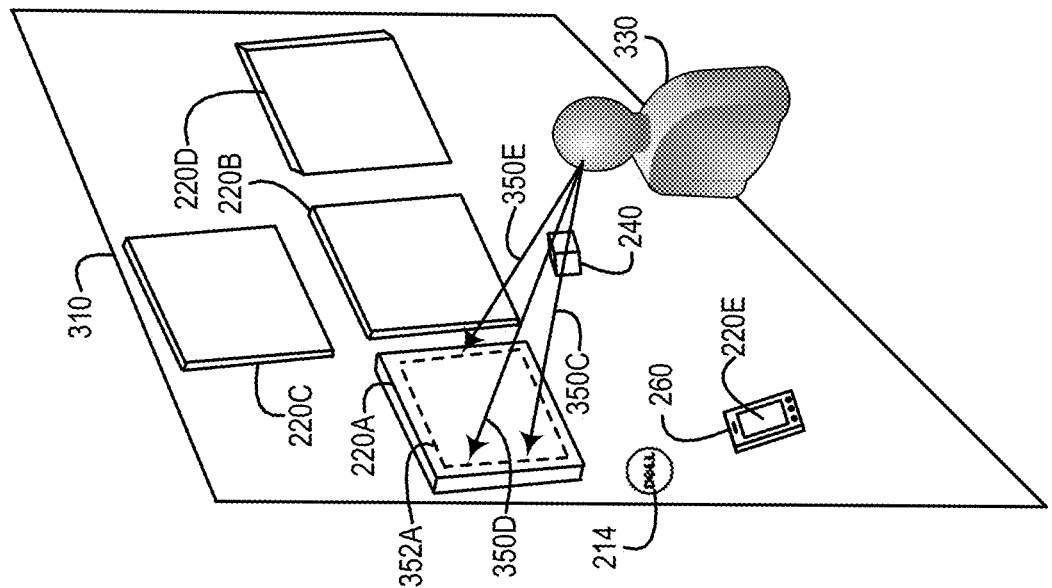

Turning now to FIGS. 3E and 3F, examples of determining locations of displays are illustrated, according to one or more embodiments. As shown in FIG. 3E, the eye of user 330 may follow a perimeter 352A associated with display 220A. In one or more embodiments, a graphic may be displayed along perimeter 352A. For example, the eye of user 330 may follow the graphic displayed along perimeter 352A. In one instance, the graphic may be static (e.g., a dotted rectangle, a solid rectangle, etc.). In another instance, the graphic may be animated (e.g., traveling along perimeter 352A). In one or more embodiments, vectors 350 may be determined as the eye of user 330 follows the graphic displayed along perimeter 352A. As an example, vectors 350C-350E may be determined as the eye of user 330 follows the graphic displayed along perimeter 352A. For instance, physical dimensions associated with display 220A may be determined based at least on vectors 350C-350E. In one or more embodiments, a physical location of display 220A may be determined based at least on vectors 350C-350E.

As illustrated in FIG. 3F, the eye of user 330 may follow a perimeter 352B associated with display 220B. In one or more embodiments, a graphic may be displayed along perimeter 352B. For example, the eye of user 330 may follow the graphic displayed along perimeter 352B. In one instance, the graphic may be static (e.g., a dotted rectangle, a solid rectangle, etc.). In another instance, the graphic may be animated (e.g., traveling along perimeter 352B). In one or more embodiments, vectors 350 may be determined as the eye of user 330 follows the graphic displayed along perimeter 352B. As an example, vectors 350F-350H may be determined as the eye of user 330 follows the graphic displayed along perimeter 352B. For instance, physical dimensions associated with display 220B may be determined based at least on vectors 350F-350H. In one or more embodiments, a physical location of display 220B may be determined based at least on vectors 350F-350H.

In one or more embodiments, physical distance 225A may be determined based at least on physical locations of displays 220A and 220B. In one or more embodiments, physical distance 225A may be determined based at least on physical dimensions associated with display 220A and based at least on physical dimensions associated with display 220B. In one or more embodiments, physical dimensions associated with displays 220C-220E may be determined in a same or similar fashion as physical dimensions associated with displays 220A and 220B may be determined. In one or more embodiments, physical locations associated with displays 220C-220E may be determined in a same or similar fashion as physical locations associated with displays 220A and 220B may be determined. In one or more embodiments, physical distance 225B may be determined based at least on physical locations of displays 220B and 220D. In one or more embodiments, physical distance 225B may be determined based at least on the physical dimensions associated with display 220B and based at least on the physical dimensions associated with display 220D. In one or more embodiments, physical distance 225C may be determined based at least on physical locations of displays 220B and 220C. In one or more embodiments, physical distance 225C may be determined based at least on the physical dimensions associated with display 220B and based at least on the physical dimensions associated with display 220C.

Figure 3H:
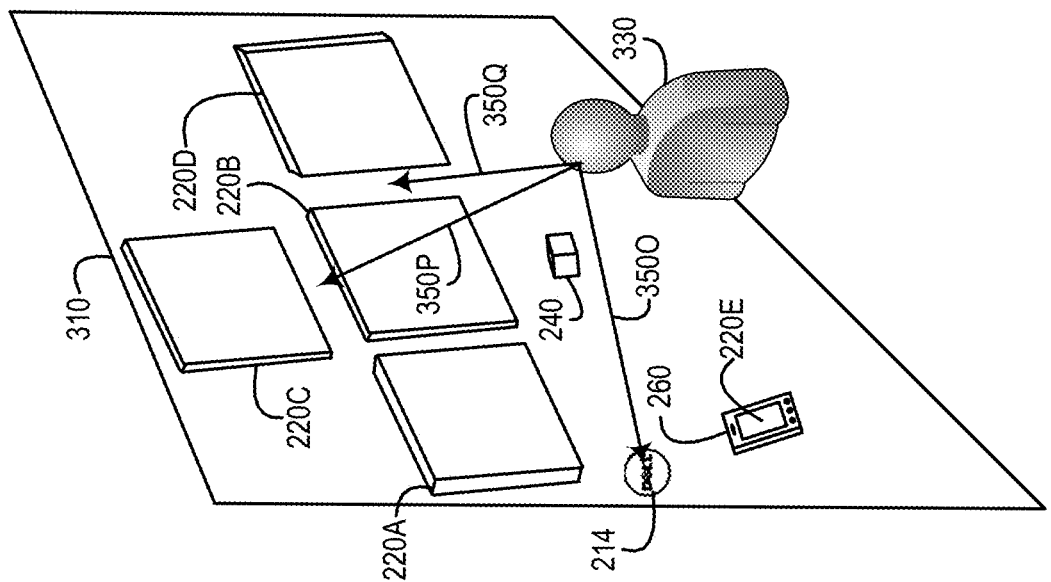
FIG. 3H illustrates an example of utilizing non-display space, according to one or more embodiments.
Figure 3G:
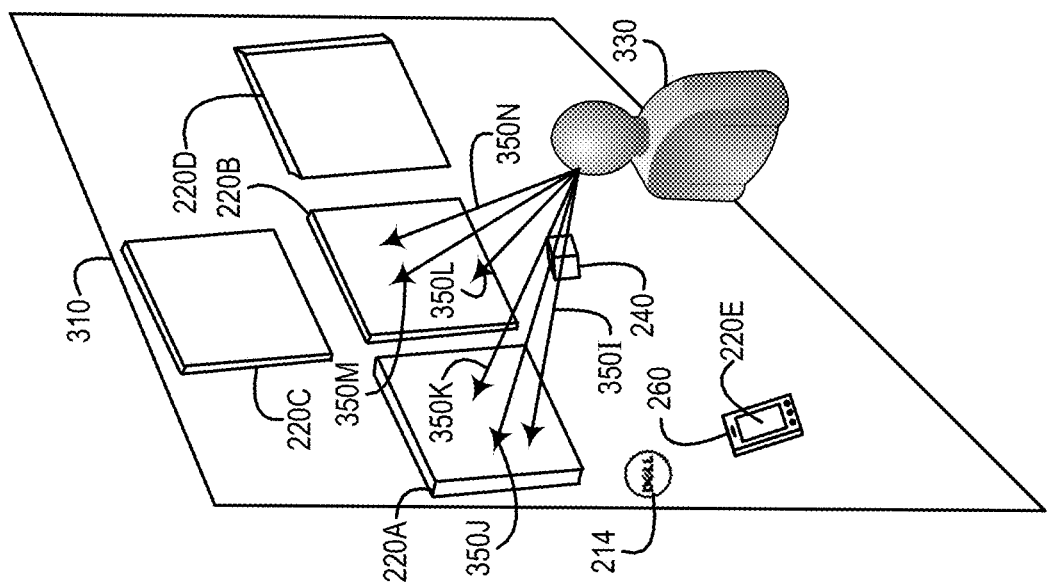
FIG. 3G illustrates another example of determining locations of displays, according to one or more embodiments.

Turning now to FIG. 3G, another example of determining locations of displays is illustrated, according to one or more embodiments. As shown, vectors 350 may be determined based at least on where the eye of user 330 is looking. For example, the eye of user 330 may be looking at a cursor or a graphic indicating a pointer. In one instance, vectors 350I-350K may be determined based at least on the eye of user 330 looking at a cursor or a graphic indicating a pointer displayed via display 220A. In another instance, vectors 350L-350N may be determined based at least on the eye of user 330 looking at a cursor or a graphic indicating a pointer displayed via display 220B.

In one or more embodiments, physical dimensions associated with a display 220 may be determined based at least on vectors 350. In one example, physical dimensions associated with display 220A may be determined based at least on vectors 350I-350K. In another example, physical dimensions associated with display 220B may be determined based at least on vectors 350L-350N. In one or more embodiments, vectors 350I-350N may be statistical samples. For example, physical dimensions associated with a display 220 may be determined based at least on the statistical samples. For instance, the statistical samples may include vectors 350. In one or more embodiments, additional statistical samples may be acquired. In one example, in determining physical dimensions associated with a display 220 via statistical samples, a number of statistical samples may be greater than or equal to a threshold number of statistical samples before the physical dimensions associated with display 220 may be determined via the statistical samples. In another example, in determining a physical location associated with a display 220 via statistical samples, a number of statistical samples may be greater than or equal to a threshold number of statistical samples before the physical location associated with display 220 may be determined via the statistical samples.

In one or more embodiments, a physical location of display 220A may be determined based at least on vectors 3501-350K. For example, the physical location of display 220A may be determined based at least on statistical samples. In one or more embodiments, a physical location of display 220B may be determined based at least on vectors 350L-350N. For example, the physical location of display 220B may be determined based at least on statistical samples. In one or more embodiments, physical dimensions associated with displays 220C-320E may be determined in a same or similar fashion as physical dimensions associated with displays 220A and 220B may be determined. In one or more embodiments, physical locations associated with displays 220C-320E may be determined in a same or similar fashion as physical locations associated with displays 220A and 220B may be determined.

In one or more embodiments, a physical location of display 220A may be determined based at least on vectors first head pose vectors. For example, the physical location of display 220A may be determined based at least on statistical samples. For instance, the statistical samples may include one or more of the first head pose vectors. In one or more embodiments, a head tracking system may determine the first head pose vectors. In one or more embodiments, eye tracking device 240 may include the head tracking system. In one or more embodiments, IHS @10 may include the head tracking system. In one or more embodiments, the head tracking system may include hardware that is coupled to one or more components of a workspace configuration. In one example, the head tracking system may include hardware that is coupled to the one or more components of the workspace configuration via a wired fashion. In another example, the head tracking system may include hardware that is coupled to the one or more components of the workspace configuration via a wireless fashion.

In one or more embodiments, a physical location of display 220B may be determined based at least on vectors second head pose vectors. For example, the physical location of display 220B may be determined based at least on statistical samples. For instance, the statistical samples may include one or more of the second head pose vectors. In one or more embodiments, a head tracking system may determine the second head pose vectors. In one or more embodiments, physical locations associated with displays 220C-320E may be determined in a same or similar fashion as physical locations associated with displays 220A and 220B may be determined.

Turning now to FIG. 3H, an example of utilizing non-display space is illustrated, according to one or more embodiments. As shown, vectors 350O-350Q may indicate that the eye of user 330 is looking at respective non-display spaces. In one or more embodiments, a method and/or a process may be performed in response to the eye of user 330 looking at a non-display space. In one example, the eye of user 330 may look at logo 214. For instance, determining that the eye of user 330 may look at logo 214 may be based at least on vector 350O. As an example, a customer service method and/or a customer service process may be performed in response to the eye of user 330 looking at logo 214. In a second example, the eye of user 330 may look at a space between displays 220B and 220C. For instance, determining that the eye of user 330 may look at the space between displays 220B and 220C may be based at least on vector 350P. As an example, a GUI of an electronic mail (email) application may become a foreground GUI in response to the eye of user 330 looking at the space between displays 220B and 220C. In another example, the eye of user 330 may look at a space between displays 220B and 220D. For instance, determining that the eye of user 330 may look at the space between displays 220B and 220D may be based at least on vector 350Q. As an example, an audio input of a conferencing application (e.g., a telecommunications application, a video conferencing application, etc.) may become muted in response to the eye of user 330 looking at the space between displays 220B and 220D. In one or more embodiments, a virtual object may be mapped into a space between two displays. For example, a method and/or a process may be performed in response to the eye of user 330 looking at the virtual object.

Figure 3I:
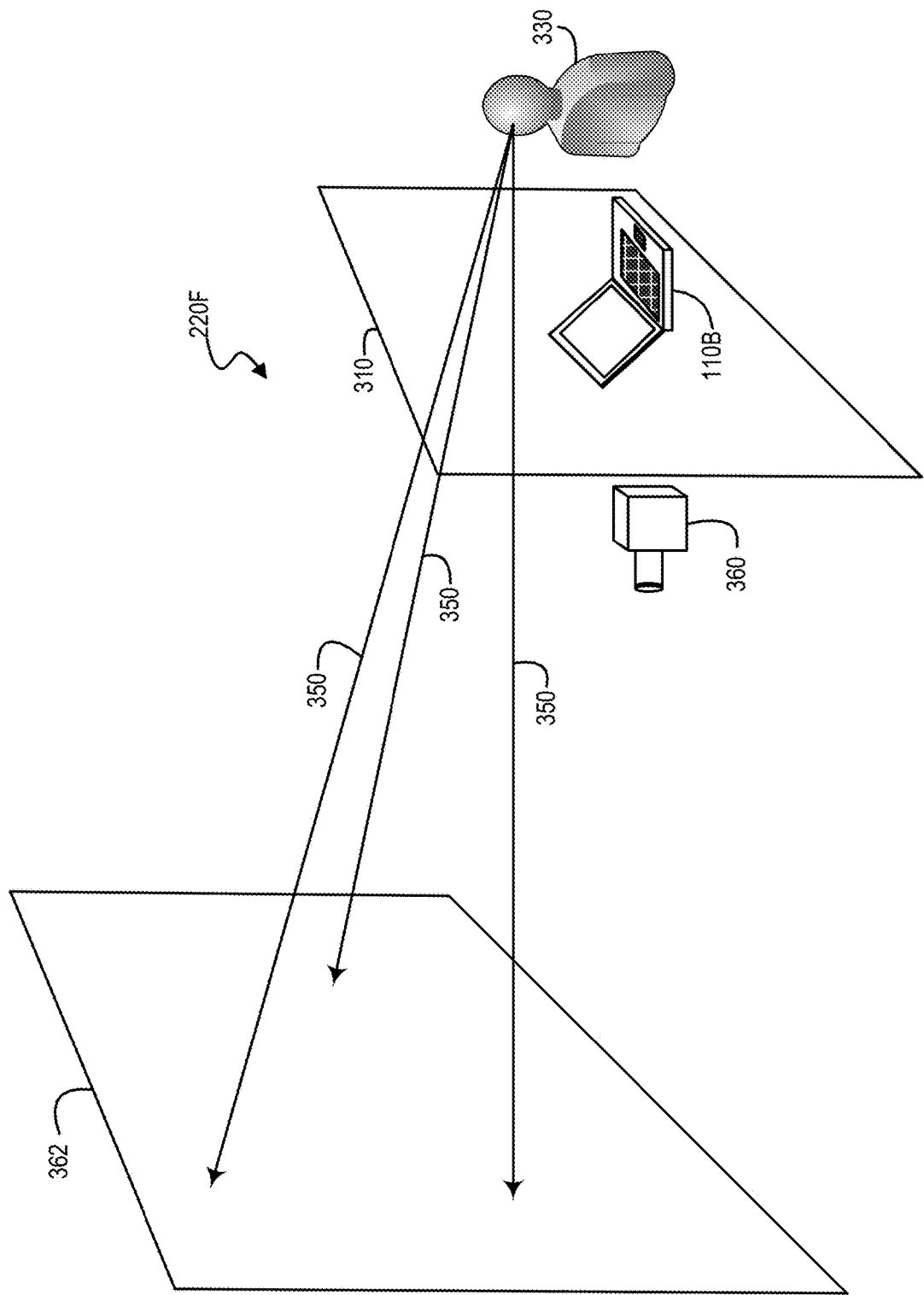
FIG. 3I illustrates an example of a projector and a reflective surface as a display, according to one or more embodiments.

Turning now to FIG. 3I, an example of a projector and a reflective surface as a display is illustrated, according to one or more embodiments. As shown, a projector 360 and a reflective surface 362 may form a display 220F. In one example, reflective surface 362 may include a projector screen or at least a portion of a projector screen. In a second example, reflective surface 362 may include a white board or at least a portion of a white board. In another example, reflective surface 362 may include a wall or at least a portion of a wall. In one or more embodiments, IHS 110B may be coupled to projector 360. In one example, IHS 110B may be coupled to projector 360 in a wired fashion. In another example, IHS 110B may be coupled to projector 360 in a wireless fashion. Although not specifically illustrated, IHS 110B may include an eye tracking device, according to one or more embodiments. As shown, vectors 350 may be determined from an eye of user 330 to reflective surface 362. In one or more embodiments, physical dimensions and/or physical dimensions of display 220F may be determined via one or more methods, one or more processes, and/or one or more systems described herein.

Turning now to FIG. 4A, an example of mapping displays to a memory medium is illustrated, according to one or more embodiments. As shown, displays 220A-220N may be mapped to a memory medium 410. For example, displays 220A-220N may be mapped to respective sections 420A-420N of memory medium 410. In one instance, pixels of display 220A may be mapped to section 420A. In a second example, pixels of display 220B may be mapped to section 420B. In another example, pixels of display 220N may be mapped to section 420N.

Although a memory section 420 is illustrated as contiguous, memory section 420 may not be contiguous. For example, memory section 420 may represent a virtual memory section in a virtual address space. For instance, a virtual address space of a virtual memory section may be contiguous. As an example, a virtual memory section that is contiguous may be mapped to non-contiguous physical memory sections.

In one or more embodiments, memory medium 410 may include non-volatile memory medium 160. In one or more embodiments, memory medium 410 may include a memory medium of a graphics processing unit. In one or more embodiments, memory medium 410 may include multiple memory media. For example, memory medium 410 may include a memory medium of IHS 110 and a memory medium of IHS 260. For instance, the memory medium of IHS 260 may be mapped into memory medium 410.

Turning now to FIG. 4B, an example of mapping vectors to a memory medium is illustrated, according to one or more embodiments. As shown, vectors 3501-350N may be mapped to memory medium 410. In one or more embodiments, vectors 3501-350N may be mapped to pixels of respective displays 220. For example, the pixels of respective displays 220 may be mapped to respective portions of memory medium 410.

Figure 5:
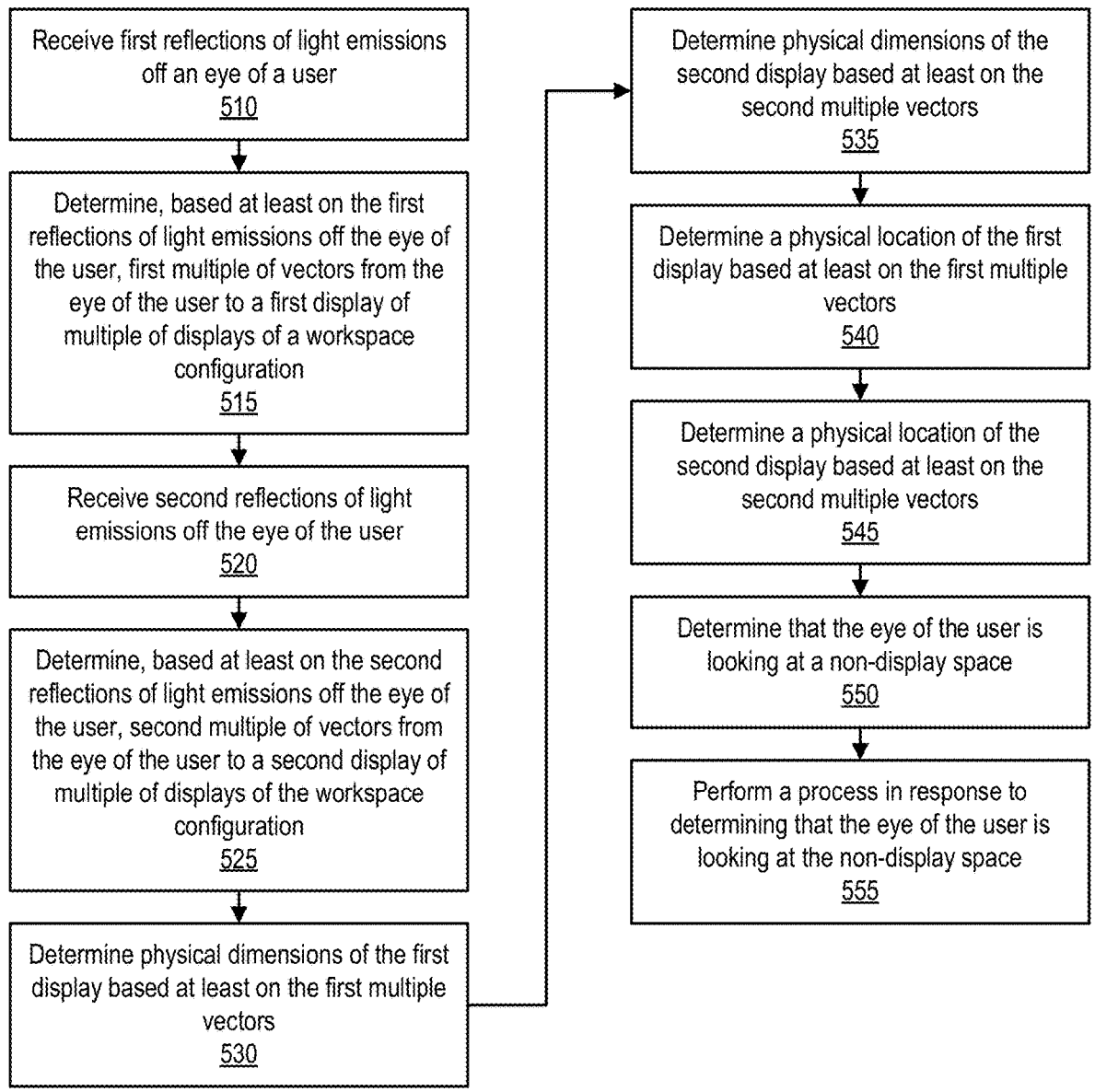
FIG. 5 illustrates an example of a method of operating a system, according to one or more embodiments.

Turning now to FIG. 5, an example of a method of operating a system is illustrated, according to one or more embodiments. At 510, first reflections of light emissions off an eye of a user may be received. For example, an eye tracking device may receive first reflections of light emissions off an eye of a user. For instance, a camera of the eye tracking device may receive the first reflections of light emissions off the eye of the user. In one or more embodiments, first multiple images of the eye of the user may be determined. For example, determining the first multiple images of the eye of the user may include the camera of the eye tracking device acquiring the first multiple images of the eye of the user.

At 515, first multiple vectors from the eye of the user to a first display of multiple displays of a workspace configuration may be determined based at least on the first reflections of light emissions off the eye of the user. In one or more embodiments, determining the first multiple vectors may be based at least on the first multiple images of the eye of the user. For example, determining the first multiple vectors based at least on the first multiple images of the eye of the user may include determining a center of a pupil of the eye of the user in the first multiple images. In one or more embodiments, each image of the first multiple images may include reflections of a pattern of light emissions off the eye of the user and the pupil of the eye of the user. For example, determining the first multiple vectors based at least on the first multiple images of the eye of the user may include comparing the pattern of light emissions off the eye of the user with the pupil of the eye of the user. In one or more embodiments, multiple first head pose vectors may also be determined.

At 520, second reflections of light emissions off the eye of the user may be received. For example, the eye tracking device may receive second reflections of light emissions off the eye of the user. For instance, the camera of the eye tracking device may receive the second reflections of light emissions off the eye of the user. In one or more embodiments, second multiple images of the eye of the user may be determined. For example, determining the second multiple images of the eye of the user may include the camera of the eye tracking device acquiring the second multiple images of the eye of the user.

At 525, second multiple vectors from the eye of the user to a second display of the multiple displays of the workspace configuration may be determined based at least on the second reflections of light emissions off the eye of the user. In one or more embodiments, determining the second multiple vectors may be based at least on the second multiple images of the eye of the user. For example, determining the second multiple vectors based at least on the second multiple images of the eye of the user may include determining the center of the pupil of the eye of the user in the second multiple images. In one or more embodiments, each image of the second multiple images may include reflections of a pattern of light emissions off the eye of the user and the pupil of the eye of the user. For example, determining the second multiple vectors based at least on the second multiple images of the eye of the user may include comparing the pattern of light emissions off the eye of the user with the pupil of the eye of the user. In one or more embodiments, multiple second head pose vectors may also be determined.

At 530, physical dimensions of the first display may be determined based at least on the first multiple vectors. In one or more embodiments, the first multiple vectors may be associated with a perimeter associated with the first display. In one or more embodiments, the eye of the user may be looking at a cursor or a graphic indicating a pointer. For example, the first multiple vectors may be associated with the eye of the user looking at the cursor or the graphic indicating the pointer displayed via the first display.

At 535, physical dimensions of the second display may be determined based at least on the second multiple vectors. In one or more embodiments, the second multiple vectors may be associated with a perimeter associated with the second display. In one or more embodiments, the eye of the user may be looking at a cursor or a graphic indicating a pointer. For example, the second multiple vectors may be associated with the eye of the user looking at the cursor or the graphic indicating the pointer displayed via the second display.

At 540, a physical location of the first display may be determined based at least on the first multiple vectors. In one or more embodiments, determining the physical location of the first display may be further based on the multiple first head pose vectors. At 545, a physical location of the second display may be determined based at least on the second multiple vectors. In one or more embodiments, determining the physical location of the second display may be further based on the multiple second head pose vectors. At 550, it may be determined that the eye of the user is looking at a non-display space. In one example, the non-display space may include a physical space between the first display and the second display. In another example, the non-display space may include a logo affixed to the first display, the second display, or an information handling system.

At 555, a process may be performed in response to determining that the eye of the user is looking at the non-display space. In one example, an audio input of a conferencing application (e.g., a telecommunications application, a video conferencing application, etc.) may become muted in response to determining that the eye of the user is looking at the non-display space. In another example, a GUI of an email application may become a foreground GUI in response to determining that the eye of the user is looking at the non-display space. In one or more embodiments, a virtual object may be mapped to the non-display space. For example, the process may be performed in determining that the eye of the user is looking at the virtual object.

In one or more embodiments, one or more of the method and/or process elements and/or one or more portions of a method and/or a process element may be performed in varying orders, may be repeated, or may be omitted. Furthermore, additional, supplementary, and/or duplicated method and/or process elements may be implemented, instantiated, and/or performed as desired, according to one or more embodiments. Moreover, one or more of system elements may be omitted and/or additional system elements may be added as desired, according to one or more embodiments.

In one or more embodiments, a memory medium may be and/or may include an article of manufacture. For example, the article of manufacture may include and/or may be a software product and/or a program product. For instance, the memory medium may be coded and/or encoded with processor-executable instructions in accordance with one or more flowcharts, one or more systems, one or more methods, and/or one or more processes described herein to produce the article of manufacture.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A system, comprising:
   at least one processor;
   an eye tracking device coupled to the at least one processor; and
   a memory medium, coupled to the at least one processor, that stores instructions executable by the at least one processor, which when executed by the at least one processor, cause the system to:
      receive, via the eye tracking device, first reflections of light emissions off an eye of a user;
      determine, based at least on the first reflections of light emissions off the eye of the user, a first plurality of vectors from the eye of the user to a first display of a plurality of displays of a workspace configuration;
      receive, via the eye tracking device, second reflections of light emissions off the eye of the user;
      determine, based at least on the second reflections of light emissions off the eye of the user, a second plurality of vectors from the eye of the user to a second display of the plurality of displays of the workspace configuration;
      determine physical dimensions of the first display based at least on the first plurality of vectors;
      determine physical dimensions of the second display based at least on the second plurality of vectors;
      determine a physical location of the first display at first coordinates with the eye tracking device as an origin based at least on the first plurality of vectors;
      determine a physical location of the second display at second coordinates with the eye tracking device as the origin based at least on the second plurality of vectors;
      determine that the eye of the user is looking at a non-display space; and
      in response to determining that the eye of the user is looking at the non-display space, perform a process.

2. The system of claim 1,
   wherein the first display is coupled to a first information handling system; and
   wherein a second information handling system, different from the first information handling system, includes the second display.

3. The system of claim 1, wherein the non-display space includes a physical space between the first display and the second display or a logo affixed to the first display, the second display, or an information handling system.

4. The system of claim 1, wherein the instructions further cause the system to:
   determine a plurality of first head pose vectors; and
   determine a plurality of second head pose vectors;
   wherein, to determine the physical location of the first display, the instructions further cause the system to determine the physical location of the first display further based at least on the plurality of first head pose vectors; and
   wherein, to determine the physical location of the second display, the instructions further cause the system to determine the physical location of the second display further based at least on the plurality of second head pose vectors.

5. The system of claim 1,
   wherein the instructions further cause the system to:
      determine a first plurality of images of the eye of the user; and
      determine a second plurality of images of the eye of the user;
   wherein, to determine the first plurality of vectors, the instructions further cause the system to determine the first plurality of vectors based at least on the first plurality of images of the eye of the user; and
   wherein, to determine the second plurality of vectors, the instructions further cause the system to determine the second plurality of vectors based at least on the second plurality of images of the eye of the user.

6. The system of claim 5,
   wherein, to determine the first plurality of vectors based at least on the first plurality of images of the eye of the user, the instructions further cause the system to determine a center of a pupil of the eye of the user in the first plurality of images; and
   wherein, to determine the second plurality of vectors based at least on the second plurality of images of the eye of the user, the instructions further cause the system to determine the center of the pupil of the eye of the user in the second plurality of images.

7. The system of claim 5,
   wherein each image of the first plurality of images includes reflections of a pattern of light emissions off the eye of the user and a pupil of the eye of the user; and
   wherein, to determine the first plurality of vectors based at least on the first plurality of images of the eye of the user, the instructions further cause the system to compare the pattern of light emissions off the eye of the user with the pupil of the eye of the user.

8. A method, comprising:
   receiving, by an eye tracking device, first reflections of light emissions off an eye of a user;
   determining, based at least on the first reflections of light emissions off the eye of the user, a first plurality of vectors from the eye of the user to a first display of a plurality of displays of a workspace configuration;
   receiving, by the eye tracking device, second reflections of light emissions off the eye of the user;
   determining, based at least on the second reflections of light emissions off the eye of the user, a second plurality of vectors from the eye of the user to a second display of the plurality of displays of the workspace configuration;
   determining physical dimensions of the first display based at least on the first plurality of vectors;
   determining physical dimensions of the second display based at least on the second plurality of vectors;
   determining a physical location of the first display at first coordinates with the eye tracking device as an origin based at least on the first plurality of vectors;
   determining a physical location of the second display at second coordinates with the eye tracking device as the origin based at least on the second plurality of vectors;
   determining that the eye of the user is looking at a non-display space; and
   in response to the determining that the eye of the user is looking at the non-display space, performing a process.

9. The method of claim 8,
   wherein the first display is coupled to a first information handling system; and wherein a second information handling system, different from the first information handling system, includes the second display.

10. The method of claim 8, wherein the non-display space includes a physical space between the first display and the second display or a logo affixed to the first display, the second display, or an information handling system.

11. The method of claim 8, further comprising:
determining a plurality of first head pose vectors; and
determining a plurality of second head pose vectors;
wherein the determining the physical location of the first display is further based at least on the plurality of first head pose vectors; and
wherein the determining the physical location of the second display is further based at least on the plurality of second head pose vectors.

12. The method of claim 8, further comprising:
determining a first plurality of images of the eye of the user; and
determining a second plurality of images of the eye of the user;
wherein the determining the first plurality of vectors is based at least on the first plurality of images of the eye of the user; and
wherein the determining the second plurality of vectors is based at least on the second plurality of images of the eye of the user.

13. The method of claim 12,
wherein the determining the first plurality of vectors based at least on the first plurality of images of the eye of the user includes determining a center of a pupil of the eye of the user in the first plurality of images; and
wherein the determining the second plurality of vectors based at least on the second plurality of images of the eye of the user includes determining the center of the pupil of the eye of the user in the second plurality of images.

14. The method of claim 12,
wherein each image of the first plurality of images includes reflections of a pattern of light emissions off the eye of the user and a pupil of the eye of the user; and
wherein the determining the first plurality of vectors based at least on the first plurality of images of the eye of the user includes comparing the pattern of light emissions off the eye of the user with the pupil of the eye of the user.

15. A computer-readable non-transitory memory medium that includes instructions that, when executed by at least one processor of a system, cause the system to:
receive, via an eye tracking device, first reflections of light emissions off an eye of a user;
determine, based at least on the first reflections of light emissions off the eye of the user, a first plurality of vectors from the eye of the user to a first display of a plurality of displays of a workspace configuration;
receive, via the eye tracking device, second reflections of light emissions off the eye of the user;
determine, based at least on the second reflections of light emissions off the eye of the user, a second plurality of vectors from the eye of the user to a second display of the plurality of displays of the workspace configuration;
determine physical dimensions of the first display based at least on the first plurality of vectors;
determine physical dimensions of the second display based at least on the second plurality of vectors;
determine a physical location of the first display at first coordinates with the eye tracking device as an origin based at least on the first plurality of vectors;
determine a physical location of the second display at second coordinates with the eye tracking device as the origin based at least on the second plurality of vectors;
determine that the eye of the user is looking at a non-display space; and
in response to determining that the eye of the user is looking at the non-display space, perform a process.

16. The computer-readable non-transitory memory medium of claim 15,
wherein the first display is coupled to a first information handling system; and
wherein a second information handling system, different from the first information handling system, includes the second display.

17. The computer-readable non-transitory memory medium of claim 15, wherein the non-display space includes a physical space between the first display and the second display or a logo affixed to the first display, the second display, or an information handling system.

18. The computer-readable non-transitory memory medium of claim 15, wherein the instructions further cause the system to:
determine a plurality of first head pose vectors; and
determine a plurality of second head pose vectors;
wherein, to determine the physical location of the first display, the instructions further cause the system to determine the physical location of the first display further based at least on the plurality of first head pose vectors; and
wherein, to determine the physical location of the second display, the instructions further cause the system to determine the physical location of the second display further based at least on the plurality of second head pose vectors.

19. The computer-readable non-transitory memory medium of claim 15,
wherein the instructions further cause the system to:
determine a first plurality of images of the eye of the user; and
determine a second plurality of images of the eye of the user;
wherein, to determine the first plurality of vectors, the instructions further cause the system to determine the first plurality of vectors based at least on the first plurality of images of the eye of the user; and
wherein, to determine the second plurality of vectors, the instructions further cause the system to determine the second plurality of vectors based at least on the second plurality of images of the eye of the user.

20. The computer-readable non-transitory memory medium of claim 19,
wherein, to determine the first plurality of vectors based at least on the first plurality of images of the eye of the user, the instructions further cause the system to determine a center of a pupil of the eye of the user in the first plurality of images; and
wherein, to determine the second plurality of vectors based at least on the second plurality of images of the eye of the user, the instructions further cause the system to determine the center of the pupil of the eye of the user in the second plurality of images.

* * * * *